(12) United States Patent
Xie

(10) Patent No.: US 12,173,916 B2
(45) Date of Patent: Dec. 24, 2024

(54) VALVE CONTROL METHOD AND CONTROL TERMINAL

(71) Applicant: Meng Xie, Hunan (CN)

(72) Inventor: Meng Xie, Hunan (CN)

( * ) Notice: Subject to any disclaimer, the term of this patent is extended or adjusted under 35 U.S.C. 154(b) by 620 days.

(21) Appl. No.: 17/285,094

(22) PCT Filed: Oct. 30, 2019

(86) PCT No.: PCT/CN2019/114417
§ 371 (c)(1),
(2) Date: Apr. 14, 2021

(87) PCT Pub. No.: WO2020/098500
PCT Pub. Date: May 22, 2020

(65) Prior Publication Data
US 2022/0026089 A1    Jan. 27, 2022

(30) Foreign Application Priority Data

Nov. 18, 2018 (CN) .......................... 201811372212.7
Nov. 18, 2018 (CN) .......................... 201811372214.6

(51) Int. Cl.
*F24F 11/49* (2018.01)
*F24F 11/523* (2018.01)
*F24F 11/58* (2018.01)

(52) U.S. Cl.
CPC ............ *F24F 11/49* (2018.01); *F24F 11/523* (2018.01); *F24F 11/58* (2018.01); *F24F 2221/22* (2013.01)

(58) Field of Classification Search
CPC ........... F24F 11/49; F24F 11/523; F24F 11/58
See application file for complete search history.

(56) References Cited

U.S. PATENT DOCUMENTS

| | | | |
|---|---|---|---|
| 7,147,516 B1* | 12/2006 | Yen ..................... | H01R 13/2442 439/630 |
| 2015/0323206 A1* | 11/2015 | Chan ...................... | F24F 11/33 700/29 |
| 2020/0278121 A1* | 9/2020 | Neal ....................... | F24C 14/02 |

FOREIGN PATENT DOCUMENTS

CN            101957018 A  *  1/2011

* cited by examiner

*Primary Examiner* — Kevin R Barss

(57) ABSTRACT

A valve control method comprises: configuring a condition for periodically triggering self-cleaning; and when a valve is continuously in an opened or closed state, or a preset time point is reached, repeatedly opening and closing the valve several times within a short period of time, such that dirt on a contact surface of a valve element is automatically removed by means of vertical or rotational movement of the valve element so as to prevent the case in which the valve is in a static state for a long period of time which causes impurities in a pipeline to be deposited on the surface of the valve element, and thereby causing the valve element to jam or have increased movement resistance. In addition, the resilience of mechanical parts such as a spring and a rubber member in the valve is not reduced as a result of the valve being in the closed or opened state for a long period of time, and the flexibility thereof is maintained. Also disclosed is a valve control terminal. In the control method and the control terminal, a valve body does not need to be disassembled, and no hardware needs to be added. The invention is easy to implement, and greatly improves the reliability of a valve.

13 Claims, 2 Drawing Sheets

VALVE CONTROL METHOD AND CONTROL TERMINAL

BACKGROUND OF THE INVENTION

The invention belongs to the field of valve control and relates to a valve control method and a control terminal.

Air conditioning terminal equipment, including fan coil units, ceiling cabinets and fresh air units, are generally installed in the indoor ceiling floor and connected with the central air conditioning system through pipelines. Cold/hot water cools or heats the air through the coil units, and then delivers the air to the room through fans; Usually, each air conditioner is equipped with a valve (or two electric water valves, cold and hot) at the end, and the indoor user controls the air conditioner through a temperature control panel.

Valves (such as electric valves, pneumatic valves, hydraulic valves, air valves, etc.) are the key components of indoor air conditioning temperature control, which are installed on the water inlet pipe at the end of the air conditioner and controlled by the temperature control panel. The temperature control panel automatically opens and closes the valve by comparing the set temperature with the indoor air temperature, thus controlling the indoor air temperature. Statistics show that valves are the components with the highest failure rate in the whole central air-conditioning system, and most of them are either stuck or closed loosely. The existing valve maintenance technology must disassemble the valve body, and hundreds of valves are installed in the indoor ceiling layer, which is very difficult to repair or replace; Moreover, the valve often bears the high water pressure in the pipeline, and there is a thermal insulation sponge on the valve body, which will leak when it is not paid attention to during maintenance, which has become a difficult problem that plagues the whole central air-conditioning industry.

At the same time, the valve is stuck due to the dirt in the water, which obviously has nothing to do with the valve manufacturer and the installation unit, which seems to be a common problem that everyone turns a blind eye to.

Therefore, the following comprehensive analysis is made on this issue:

1. Analysis of service environment: although the valve inlet is equipped with a filter, it can only filter and remove impurities with large particles in water; For a huge central air-conditioning water circulation system, there are often fine impurities in the water that cannot be filtered, such as solid dust, calcium and magnesium ions in the water, etc., at the same time, the carbon steel pipeline will also produce rust mud after a long time in the water.

In addition, the central air-conditioning system usually operates intermittently and in stages, turning on during the day, turning off at night and running in summer and winter; Especially during the Spring Festival and autumn months, the pipeline circulating pumps and valves will remain closed for several months, and the water in the pipeline will always be in a static state. Fine impurities and rust mud in the water will slowly deposit on the inner wall of the pipeline and the surface of the valve core. Moreover, the water temperature in the pipeline also changes greatly. The low temperature water of 7-12° C. in summer will accelerate the rust and corrosion of the pipeline, while the high temperature water of 45-60° C. in winter will accelerate the calcification and hardening of deposits on the surface of the valve core.

2. Object Analysis
   1) Valves: As a valve manufacturer, it only pays attention to the quality of the valve itself, such as water pressure resistance, reliability of electronic components of electric actuators, structural strength of valve bodies and so on; To solve the problem that the valve is easily stuck, it is usually to increase the power of the valve body driving motor or improve the material of the valve core, such as changing metal into ceramic, etc. However, the effect is not satisfactory from the practical application at present, and it often increases the valve cost and reduces the cost performance ratio. Because the valve with the best quality can not cope with the continuous accumulation of scale, valve manufacturers will not include this problem in their product quality problems at all.
   2) Controller: The valve is electrically connected with the temperature control panel of the fan coil unit, and its opening and closing are controlled by the temperature control logic of the temperature control panel. The existing temperature control panel only serves indoor air conditioner users, which meets some use requirements of convenient operation, beautiful appearance and comfortable temperature control. Therefore, the temperature control panel manufacturers have no reason to consider the problem that the valve is stuck or not tightly closed.
   3) Pipeline installation unit: Only consider that the pipeline does not leak water, and the water is evenly divided. Generally, only clean the impurities of the water filter after installation. As for the valve being stuck by scale during operation, it is not a problem to be considered.
   4) Central air conditioning management and maintenance unit: In addition to water quality treatment of circulating water, the valve can only be repaired or replaced, which is only a passive treatment department and cannot solve the fundamental problem.

From the above analysis, it can be seen that each object is responsible for its own duties, and each object does not and cannot analyze and solve the problem as a whole and fundamentally. Therefore, it is necessary to design a brand-new valve self-cleaning device and method, which can not only reduce the failure rate of the valve, but also facilitate the central air-conditioning manager to manage the temperature of the air conditioner and reduce the operating energy consumption.

In addition, the valves are usually controlled by a temperature control panel, and the temperature control is realized by opening and closing the valves. However, the functions of the existing temperature control panel are all aimed at users, and they pursue excellent air-conditioning effect, without considering air-conditioning energy saving, so the temperature control setting range is generally fixed and unadjustable. In order to meet various complex temperature requirements, the existing temperature control panel manufacturers generally set the temperature range very large. When cooling in summer, the lowest temperature of indoor air-conditioning can be allowed to be set to 10° C. or even 5° C.; When heating in winter, the maximum temperature of indoor air conditioning can be set to 30° C. or even 35° C. Once the user's temperature is set improperly, it will cause great energy waste. Therefore, many managers of central air-conditioning users have to adopt regulations to restrain air-conditioning users, requiring users not to set the minimum temperature lower than 26° C. in summer and the maximum temperature higher than 20° C. in winter.

There are also temperature control panels that can lock the temperature, but they can't be set separately according to the cooling and heating modes, only one maximum temperature limit and one minimum temperature limit can be set.

Because the temperature control logic of cooling and heating is just opposite, the manager must set it again in winter after cooling in summer and repeat it in the next year, which is extremely impractical.

There is also a patent CN200720067201.9 fan coil temperature limiting thermostat, which can also limit the lowest cooling temperature and the highest heating temperature, but it must be realized by computer software programming, and the temperature control panel must also have a communication interface, and this function cannot be realized by its own buttons on the temperature control panel. To realize the networking temperature limiting function, hardware such as communication modules, computer equipment and control software must be added to all temperature control panels, and construction wiring must be added, so the investment cost should be increased by 3-4 times. Therefore, most temperature control panels of central air conditioners have no networking function at present, so this technology is not practical.

BRIEF SUMMARY OF THE INVENTION

The technical problem to be solved by the present invention is to provide a valve control method and a control terminal, which are easy to implement and can improve the reliability of the valve without disassembling the valve body.

The technical solution of the invention is as follows:

A valve control method comprises the following steps of: setting a triggering condition and a self-cleaning action for periodically triggering the valve self-cleaning action on a control center (such as a computer connected with a server or a central control computer in a control room) or a control terminal (such as a field controller installed in a valve accessory) connected with the valve; The control center or control terminal is connected with the valve to control the self-cleaning action of the valve, and can also control the opening or closing of the valve during the cooling or heating operation at the end of the air conditioner; The valve is connected with the air conditioner end water pipe.

The valves here usually refer to non-manual valves, such as electric valves, pneumatic valves, hydraulic valves, pneumatic valves, etc.

When the trigger condition is met, trigger the self-cleaning action of the valve; The valve self-cleaning action refers to repeatedly opening and closing the valve in a short time, allowing the valve core to move up and down or rotate, automatically removing the dirt on the contact surface of the valve core, and preventing the valve from standing still for a long time, and the impurities in the pipeline deposit too much on the surface of the valve core, causing the valve core to be stuck or increasing the resistance of the valve core movement; At the same time, the internal mechanical parts of the valve, such as springs and rubber parts, will not become rigid because they remain closed or open for a long time, and maintain their flexibility; The valve self-cleaning action is set on the control center or control terminal.

Further, the switch action in the self-cleaning action of the valve. The existing temperature control panel control valves are directly powered on and opened or closed in one step, and once there is foreign matter in the valve core, they are often directly stuck, resulting in the burning of the motor in the valve. The control center or control terminal drives the valve in a flexible switch mode; It can be opened and closed in a flexible switch mode, or only opened or closed in a flexible switch mode.

In many valve application places, the inertia of the control medium is large, such as the electric water valve in the central air conditioner, and the influence of the action of more than ten seconds on the air temperature can be almost ignored; At the same time, the valve is different from the solenoid valve with instantaneous action, and the switch action time is generally more than ten seconds, which makes it possible to realize flexible switch.

The flexible switching mode means that the valve driving signal adopts positive and negative progressive mode. When the control center or control terminal drives the valve from closed to open, it first gives the valve opening signal to make the valve core move forward for a certain position, and then gives the valve closing signal. The valve makes the core move backward for a certain position, repeating several times, each time the reverse movement position is smaller than the forward movement position, and then all the valves are opened, with a slight pause between the forward and reverse movements.

If the valve action time is 10 seconds, first send out a 5-second open signal, stop for 1 second, then send out a 2-second closing signal, then stop for 1 second, then send out a 5-second open signal, stop for 1 second, then send out a 2-second closing signal, then stop for 1 second, finally send out a 4-6-second open signal, and the valve is fully open. And vice versa; This method is mainly applicable to valves with positive and negative spool movement.

Or the flexible switching mode means that the valve driving signal adopts pulse progressive mode. When the valve is turned from closed to open, first give the valve an opening signal pulse, then interrupt the opening signal, then give the valve an opening signal pulse, and repeat it for several times until the valve is fully opened.

If the valve action time is 10 seconds, first send out a 3-second open signal, stop for 1 second, then send out a 3-second open signal, stop for 1 second, and finally send out a 4-6-second open signal, and the valve is fully open. or vice versa, Dallas to the auditorium This method is mainly applicable to valves whose valve core is opened when power is on, and whose valve core is closed and reset by spring after power is off. In this way, through the forward movement of power transmission, the power-off spring pushes the reverse movement to realize the flexible opening of the valve core in the opening process.

The purpose of flexible switch mode is to make impurities attached to the surface of the valve core or stuck at the valve core loose by moving back and forth, so as to prevent one-time blocking. Combined with the flow of pipeline water, the loose impurities are washed away and the valve core becomes flexible.

Furthermore, when the valve is opened or closed in the forward direction, only the driving current of the valve exceeds the set current, the flexible switch mode is adopted.

Further, the parameter setting of the condition is completed on the control terminal by manual key pressing.

Furthermore, the conditions are triggered (or triggered) by keys independently set on the control terminal.

Further, enter the parameter setting of the condition through the combination of a plurality of existing keys on the control terminal; Or enter the parameter setting of the condition by long pressing the existing key on the control terminal.

Furthermore, when there are a large number of valves in the whole system, in order to avoid sudden change of pipeline flow caused by simultaneous operation of multiple valves, a random parameter S is added to the trigger time, that is, the self-cleaning action of valves is triggered after the preset trigger time is reached. Specifically, the random parameters are S1 and S2. If the valve is in a closed state before self-cleaning, the self-cleaning action of the valve will be triggered by delaying S1 time after the preset triggering time arrives; if the valve is in an open state before self-cleaning, the self-cleaning action of the valve will be triggered by delaying S2 time after the preset triggering time arrives.

Furthermore, the control terminal is provided with a network interface, the control terminal is connected to the Internet through the network interface, and the control terminal is remotely controlled by a computer to realize parameter setting.

A valve self-cleaning device adopts the control terminal of the valve control method.

Further, the control terminal is a temperature control terminal or a temperature control panel.

The control function of the valve is usually assembled on the temperature control panel, and the temperature is controlled by opening and closing the valve. Therefore, the valve self-cleaning device can be a temperature control terminal, which can realize the temperature control function. The temperature control terminal includes a control module (such as MCU, etc.), a display screen and an input module. The display screen and the input module are both connected with the control module;

The temperature control terminal is provided with an output terminal for controlling the fan and the valve;

The input module is used for inputting instructions or parameters;

And connected with the fan of the fan coil unit, which can control the start-stop and rotation speed of the fan, set and detect the indoor temperature, and control the indoor temperature by opening and closing the valve. By setting the program of the self-cleaning method in the temperature control terminal or the temperature control panel, the valve can be automatically cleaned.

Furthermore, in addition to adopting flexible switch mode when the valve is self-cleaning, when the temperature control panel operates in cooling or heating mode, the program of flexible switch mode of the valve can also be set in the temperature control terminal or the temperature control panel.

Furthermore, a valve driving current detection device is arranged in the temperature control panel, and when the temperature control panel runs in cooling or heating mode, only the driving current of the valve exceeds the set current, the flexible switching mode is adopted.

If the valve is applied to the fan coil unit, because of the inertia of indoor air temperature, the action time of the valve increased by more than ten seconds will not affect the air conditioning effect at all.

In addition, the input module is configured to set a control mode (specifically for setting cooling, heating and air supply modes), a target temperature value (i.e., which temperature is desired to be maintained indoors), and a locked temperature value, wherein the locked value is a locked cooling minimum value or a locked heating maximum value;

In the cooling mode, when the target temperature value is set, if the control module detects that the set target temperature reaches the locked cooling minimum value, the control module will no longer respond to further lowering the set target temperature value; At this time, a prompt can be given on the display screen;

In the heating mode, when the target temperature value is set, if the control module detects that the set target temperature value reaches the locked heating maximum value, the control module will no longer respond to further increase of the set target temperature value;

It can also be said: When the user adjusts the set temperature in the refrigeration mode, the set temperature will not decrease after reaching the lowest value of locking refrigeration; After the manager locks the heating maximum value under the temperature locking function, when the user adjusts the set temperature in the heating mode, the set temperature will not rise after reaching the locked heating maximum value.

Thereby preventing the user from setting the temperature too low or too high in the internal program of the temperature control panel.

Make that lowest value of loc refrigeration equal to or higher than the lower limit value; The maximum locking heating value is equal to or lower than the upper limit value;

Preferably, a relay is arranged on the temperature control terminal, and the fan, the valve and the like are controlled by the relay;

The display screen is used to display status data (including current temperature value, switch status, current working mode, etc.) or set parameters (upper and lower limits being set or already set);

The input module is a key (i.e., a physical key) or a touch screen.

The control module is connected with a nonvolatile memory; The locked cooling minimum value or the locked heating maximum value is stored in the nonvolatile memory.

The temperature control terminal is provided with a temperature sensor or connected with a temperature sensor through a data line, so that the real-time temperature value on the spot can be detected.

The lock key is set separately.

The locking key is a hidden key, for example, a cover plate is arranged on the key, and the key can be pressed after the cover plate is turned over.

The locking key is realized by using a plurality of existing keys in combination (such as pressing the mode key and the add key at the same time).

The temperature control terminal is in communication connection with the master control center, so that the master control center can lock the upper and lower temperatures of all the temperature control terminals.

The temperature control terminal is a temperature control panel.

A temperature control method adopts the temperature control terminal to realize indoor temperature control;

In the cooling mode, when the temperature is set, if the control module detects that the set temperature reaches the locked cooling minimum value, the control module will no longer respond to further lowering the set temperature value; At this time, a prompt can be given on the display screen;

In the heating mode, when the temperature is set, if the control module detects that the set temperature reaches the locked heating maximum value, the control module will no longer respond to the further increase of the set temperature value; At this time, a prompt can be given on the display screen.

A valve self-cleaning control terminal comprises a control module, a display screen and an input module; The display screen and the input module are both connected with the control module; The valve self-cleaning control terminal is provided with an output terminal for controlling the valve; Is connected with the valve and can control the opening and closing of the valve, and the input module is used for inputting instructions or parameters;

The valve self-cleaning control terminal has a valve self-cleaning program and can set self-cleaning triggering conditions and self-cleaning actions; When the self-cleaning conditions are met, the valve self-cleaning control terminal drives the valve to make self-cleaning action.

Further, the self-cleaning trigger condition means that the valve keeps open or closed for N days, wherein the state of the valve is detected by the valve self-cleaning control terminal; N is an integer or decimal number greater than 1. For example, in spring and autumn, the central air conditioning system and valves are closed for several months. If N is set to 15 days, the self-cleaning action will be automatically triggered every 15 days.

Further, the self-cleaning triggering condition refers to reaching a preset periodic time point, such as automatically starting at 12 o'clock on the 1st of every month, at which time the self-cleaning action of the electric water valve is triggered regardless of whether the air conditioner terminal is running or not; Because the self-cleaning action time is short, less than one minute, even if the air conditioning terminal is running, the impact on indoor air conditioning can be almost ignored.

Further, the self-cleaning triggering condition means that the air-conditioning terminal starts at a certain time point when the air-conditioning terminal does not work after the periodic operation ends, for example, at 6 pm every day, the self-cleaning action of the electric water valve is triggered after the air-conditioning does not run and shuts down;

Judging the conditions under which the valve triggers self-cleaning action is usually automatically detected by the valve self-cleaning control terminal or remote control center. Through this periodic valve self-cleaning action, the reliability of the valve can be greatly improved.

Further, the self-cleaning action of the valve means that the state of the valve is switched from opening to closing, or from closing to opening once, and then returns to the original state after being switched even several times; By repeatedly opening and closing the valve in a short time, the valve core moves up and down or rotates, automatically removing the dirt on the contact surface of the valve core, preventing the valve from standing still for a long time, and the impurities in the pipeline deposit too much on the surface of the valve core, causing the valve core to be stuck or increasing the resistance of the valve core movement; At the same time, the internal mechanical parts of the valve, such as springs and rubber parts, will not become rigid because they remain closed or open for a long time, thus maintaining their flexibility.

Further, the valve self-cleaning action means that the automatic valve is switched even several times, and then returns to the original state, and the state of the valve is switched from open to closed or from closed to open for one time. Specifically, the valve can be opened or closed for t1 seconds, then closed or opened for t2 seconds, and repeated for m times. Specifically, the values of t1, t2 and M can also be set.

Furthermore, when there are a large number of valves in the whole system, in order to avoid sudden change of pipeline flow caused by simultaneous operation of multiple valves, a random parameter S is added to the starting time, that is, the self-cleaning action of valves is started after the preset starting time is reached. Specifically, the random parameters are S1 and S2. If the valve is in a closed state before self-cleaning, the self-cleaning action of the valve will be started by delaying S1 time after the preset starting time arrives; if the valve is in an open state before self-cleaning, the self-cleaning action of the valve will be started by delaying S2 time after the preset starting time arrives.

Further, the valve self-cleaning control terminal is provided with a linkage signal output terminal, and when the valve is a water valve, the valve self-cleans and starts the water pump. If the pump runs for a short time, it will not cause other adverse effects on the system, but flushing the valve core with water flow will have a better self-cleaning effect. In addition, valve self-cleaning is not only applied to air-conditioning waterway system, but also applied to other industries using electric fluid valves, such as electric air valves, electric air valves, electric hydraulic valves, electric steam valves, etc. When the valve core is repeatedly opened and closed, the fluid can flow at the valve core, which can wash away the dirt at the valve core faster.

Therefore, when the valve is an air valve, the valve self-cleans and starts the air pump at the same time; When the valve is an oil valve, the valve self-cleans and starts the oil pump; When the valve is an air valve, the valve self-cleans and starts the fan at the same time; When the valve is a steam valve, the valve is self-cleaning and the steam source is turned on.

Supplementary explanation on valve self-cleaning:
1) •After keeping the closed state for N days, it will automatically open for t1 seconds, then close for t2 seconds, repeat for m times, and then return to the original closed state;
2) •After being kept open for n days, it will automatically close for t1 seconds, then open for t2 seconds, repeat for m times, and then return to the original open state.

When the valve self-cleaning is applied to the fan coil at the end of the central air conditioner, due to the long cycle of self-cleaning, the value of n is usually 7-30 days, the number of self-cleaning times m is 3-8 times, and the time of repeated action of the valve is less than one minute, so the energy consumption of valve movement is almost negligible throughout the year. In addition, even in winter or summer air conditioning season, due to the inertia of indoor air temperature, the short-term valve opening and closing has almost negligible influence on indoor air conditioning effect. In this way, no matter in air conditioning season or non-air conditioning season, dirt will not be deposited on the surface of the valve core because the water in the pipeline is still for a long time.

However, if the valve is used in some special circumstances, the self-cleaning of the valve will affect the safe operation of the installed valve system, and a chain condition of safety protection can be added. Only when the chain condition sequence allows, the self-cleaning can be started.

Furthermore, that valve self-clean control terminal is a temperature control terminal which comprises a control module and a display screen, an output module and an input module connected with the control module; The output module is connected with the valve and fan at the end of the air conditioner, and the input module includes buttons for setting parameters or instructions; The input module can set self-cleaning trigger conditions and self-cleaning actions; A timer and a clock are arranged in the control module; Generally used for the terminal fan coil units, fresh fans and ceiling cabinets of central air conditioners, also called temperature control panels.

Furthermore, the keys and the display screen are integrated touch screens.

Further, the setting of the self-cleaning trigger condition is entered by combining a plurality of existing keys on the input module or pressing the keys for a long time.

Further, the setting of the self-cleaning trigger condition is entered through the lock key separately set on the input module.

Furthermore, the input module is provided with a network interface, and self-cleaning triggering conditions and self-cleaning actions are remotely set by a computer.

The control module is connected with a nonvolatile memory; Self-cleaning parameter storage can be stored in nonvolatile memory.

In addition, the valve self-cleaning control terminal includes a flexible switch mode in driving the valve switch.

In addition to the conventional direct switch, the valve also has a flexible switch mode; That is, the valve is opened in a flexible way, or closed in a flexible way, or both valves are opened and closed in a flexible way; Or the flexible switch mode is adopted for each action of the valve, or the flexible switch mode is adopted only for the specific part of the valve.

In many valve application places, the inertia of the control medium is large, such as the electric water valve in the central air conditioner, and the influence of the action of more than ten seconds on the air temperature can be almost ignored; At the same time, the valve is different from the solenoid valve with instantaneous action, and the switch action time is generally more than ten seconds, which makes it possible to realize flexible switch.

Further, the flexible switching mode means that the valve driving signal adopts positive and negative progressive. When the valve is turned from closed to open, the valve opening signal is given first to make the valve core move forward for a certain position, and then the valve closing signal is given to make the valve core move backward for a certain position, which is repeated several times, and the reverse movement position is smaller than the forward movement position every time, and then the valve is fully opened, in which the forward and reverse movements can pause slightly; or vice versa, Dallas to the auditorium If the valve action time is 10 seconds, first send out a 5-second opening signal, stop for 1 second, then send out a 2-second closing signal, then stop for 1 second, then send out a 2-second closing signal, then stop for 1 second, finally send out a 4-6-second opening signal, and the valve is fully open. And vice versa; This method is mainly applicable to valves with positive and negative spool movement.

Further, the flexible switching mode means that the valve driving signal adopts pulse type. When the valve is turned from closed to open, first give the valve an opening signal pulse, then interrupt the opening signal, then give the valve an opening signal pulse, and repeat it several times until the valve is fully opened, and vice versa.

If the valve action time is 10 seconds, first send out a 3-second open signal, stop for 1 second, then send out a 3-second open signal, stop for 1 second, and finally send out a 4-6-second open signal, and the valve is fully open. or vice versa, Dallas to the auditorium This method is mainly applicable to valves whose valve core is opened when power is on, and whose valve core is closed and reset by spring after power is off. In this way, through the forward movement of power transmission, the power-off spring pushes the reverse movement to realize the flexible opening of the valve core in the opening process.

The purpose of flexible switch mode is to make impurities attached to the surface of the valve core or stuck at the valve core loose by moving back and forth, so as to prevent one-time blocking. Combined with the flow of pipeline water, the loose impurities are washed away and the valve core becomes flexible.

Furthermore, the input module is provided with a valve driving current detection circuit, and when the valve operates, the flexible switch mode is triggered only when the driving current exceeds the set current.

Further, the trigger condition of the flexible switch mode can also mean that the valve keeps open or closed for n days; N is an integer or decimal number greater than 1; Or reaching a preset time point.

Further, the parameters also include repetition times, forward and backward action time, pulse time, etc. in the flexible switch mode, which can be set by the input module or directly solidified in the control module.

Furthermore, the parameters can be set with a network interface through the valve flexible controller, and the parameters can be set on the computer after the valve flexible controller is remotely connected with the remote computer.

In addition, the temperature control panel has the function of temperature locking.

The input module is config to set a control mode (specifically for setting cooling, heating and air supply modes), a target temperature value (i.e., which temperature is desired to be maintained indoors), and a locked temperature value, wherein the locked value is a locked cooling minimum value or a locked heating maximum value;

In the cooling mode, when the target temperature value is set, if the control module detects that the set target temperature reaches the locked cooling minimum value, the control module will no longer respond to further lowering the set target temperature value; At this time, a prompt can be given on the display screen;

In the heating mode, when the target temperature value is set, if the control module detects that the set target temperature value reaches the locked heating maximum value, the control module will no longer respond to further increase of the set target temperature value;

It can also be said that when the user adjusts the set temperature in the refrigeration mode, the set temperature will not decrease after reaching the lowest value of locking refrigeration; After the manager locks the heating maximum value under the temperature locking function, when the user adjusts the set temperature in the heating mode, the set temperature will not rise after reaching the locked heating maximum value.

Thereby preventing the user from setting the temperature too low or too high in the internal program of the temperature control panel.

Make that lowest value of loc refrigeration equal to or higher than the lower limit value; The maximum locking heating value is equal to or lower than the upper limit value.

The lock key is set separately.

The locking key is a hidden key, for example, a cover plate is arranged on the key, and the key can be pressed after the cover plate is turned over.

The locking key is realized by using a plurality of existing keys in combination (such as pressing the mode key and the add key at the same time).

The temperature control panel is in communication with the main control center, so that the main control center can lock the upper and lower temperatures of all the temperature control panels.

Beneficial Effects:

The valve self-cleaning device (or control terminal, control panel, temperature control panel, etc.) and method of the present invention have the following characteristics:
  (1) Self-cleaning maintenance of valves: On the basis of the existing mode of the temperature control panel, hardware is not added, the valve can be automatically and periodically opened and closed by using the internal computer programmable function of the existing temperature control panel, and the dirt on the surface of the valve core can be automatically removed without disassembling the valve body through the movement of the valve core, so that the surface of the valve core will not be stationary for a long time, forming hard deposits on it, keeping its flexibility, thus reducing the failure rate of the valve!

(2) Flexible valve switch: The existing temperature control panel control valves are directly opened or closed, and once there are foreign bodies in the valve core, they are often directly stuck, resulting in the burning of the motor in the valve. In the invention, a valve flexible switch mode is adopted on the control terminal or temperature control panel. When the valve is turned from closed to open, the valve is opened first, the valve core moves forward for a certain position, then the valve is closed, the valve core moves backward for a certain position, repeated for several times, and then all the valves are opened. In this way, through repeated actions for several times, foreign matters at the valve core are easy to loosen, and the possibility that the valve core is stuck and the motor burns out is reduced.

(3) Temperature independent locking: On the basis of the existing mode of the temperature control panel, the temperature locking function which can lock the lowest cooling value and the highest heating value respectively is added; After locking the refrigeration minimum value under the temperature locking function and adjusting the set temperature in the refrigeration mode, the set temperature will not decrease after reaching the locked refrigeration minimum value; When the maximum heating value is locked under the temperature locking function and the set temperature is adjusted in the heating mode, the set temperature will not rise after reaching the locked maximum heating value.

Moreover, all the above three functions can be realized only by modifying the control software of the temperature control panel! Make it have great cost performance.

The Creativity of that Invention Ly in:

Considering the problem from the perspective of equipment maintenance completely jumps out of the thinking range of the traditional fan coil temperature control panel and the conventional application mode of the valve. What is even more rare is that the existing resources can be used at the same time, and the historical problem that the electric water valve is easy to get stuck is solved through the fan coil temperature control panel without increasing any labor and material costs!

Considering the problem from the perspective of equipment management, the present invention also extends the existing fan coil temperature control panel from the use layer to the central air conditioning management layer. In order to realize temperature management in the existing central air-conditioning system, many hardware and software devices such as host computer, field controller and integrated wiring are generally added, and networking interface must be added to the temperature control panel, which leads to large investment. However, the invention only needs to modify the control logic program inside the fan coil temperature control panel, does not increase any hardware cost, and changes the fan coil temperature control panel from a simple air conditioner switch to a temperature management tool of an air conditioner manager.

Label description: 20—on key, 33—mode key, 22—wind speed key, 23—increase key, 24—decrease key, 32—wind speed icon, 34—indoor temperature icon, 35—set temperature icon, 36—date and time icon, and 31—valve icon.

DETAILED DESCRIPTION OF THE INVENTION

The invention will be further described in detail with reference to the drawings and specific embodiments.

Embodiment 1

Figure 1:
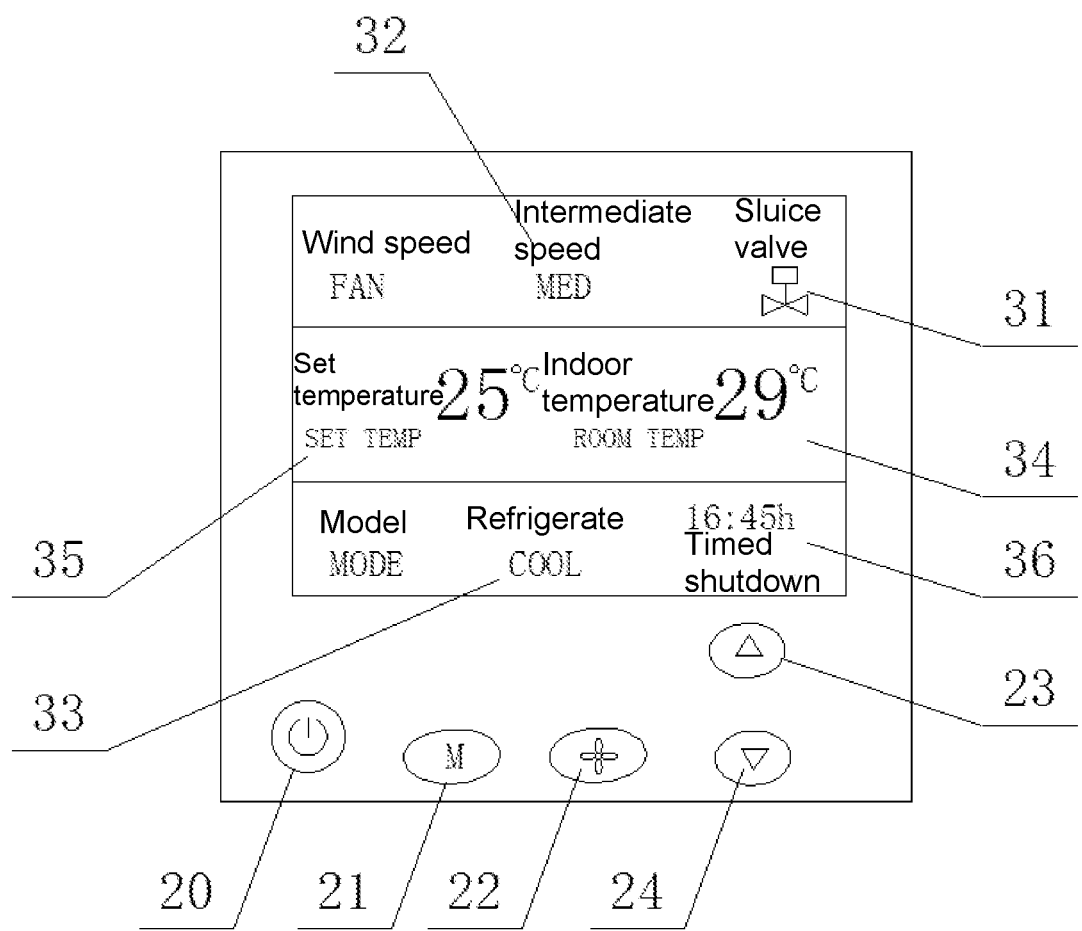
FIG. 1 is a schematic structural diagram of a temperature control panel.
Figure 2:
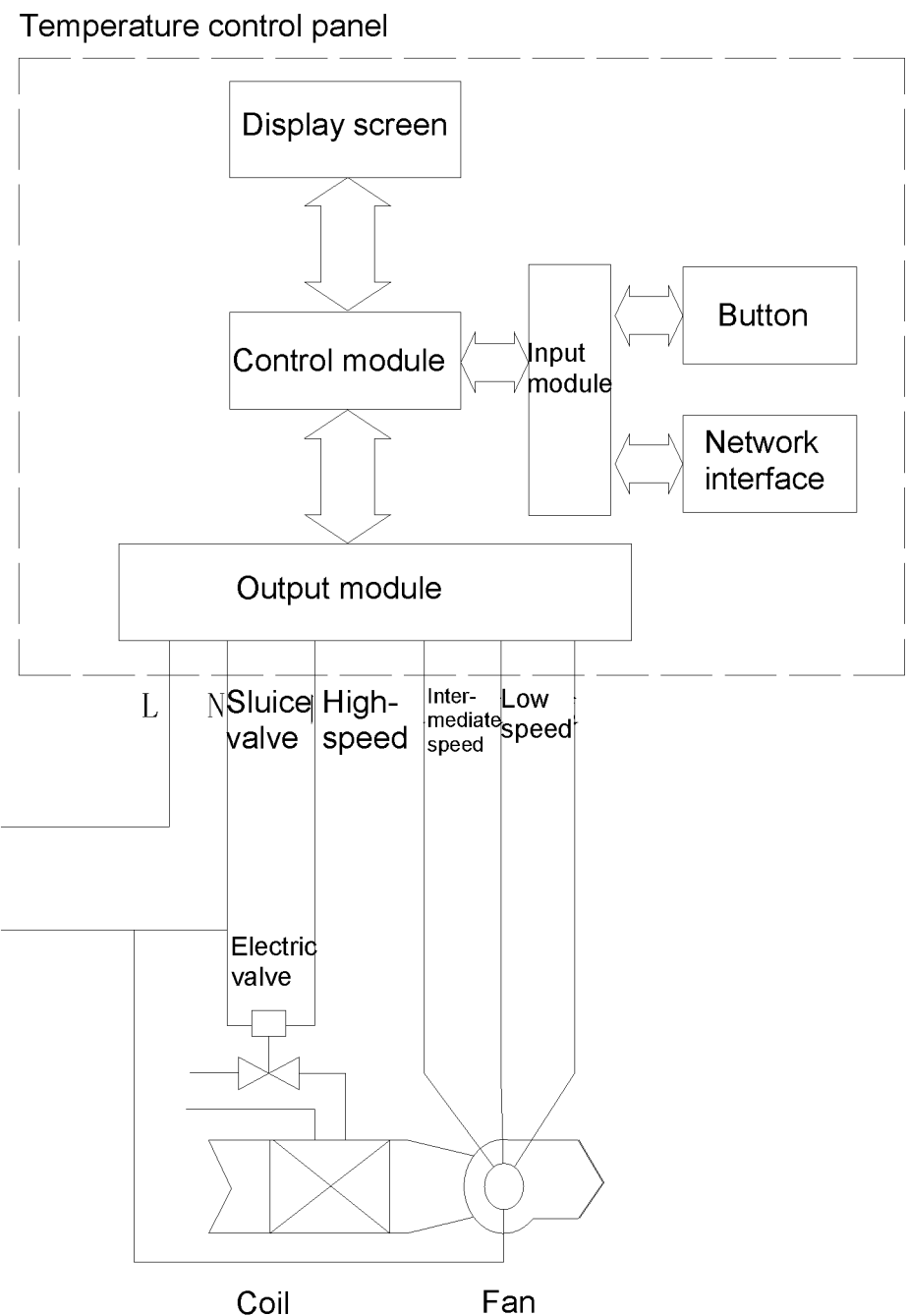
FIG. 2 is a schematic diagram of connection between temperature control panel, fan coil and valve.

As shown in FIG. 1 and FIG. 2, a valve self-cleaning device (or temperature control panel) comprises a display screen, operation buttons and an output board, wherein the display screen can display icons of operation modes 33, including cooling, heating and air supply modes and wind speed icons 32, and icons of indoor temperature 34, set temperature 35, date and time 36 and valve 31; Among them, the operation keys include on/off key 20, mode key 21, wind speed key 22, increase key 23 and decrease key 24. With the mode key 21, the temperature control panel can be placed in cooling, heating and air supply modes respectively.

The output module is electrically connected with the valve of the fan coil unit and the fan, wherein the valve comprises an internal valve core and is connected with the fan coil unit through a water pipe; The electrical connection includes that the output module is directly connected with the valve and the fan, and the output directly drives the valve and the fan; It also includes the output module connected with the driving module of valve and fan through the signal line. At this time, the output module does not directly drive the valve and fan, and the temperature control panel of hotel guest room adopts this mode.

Further, the operation keys and the display screen can adopt an integrated touch liquid crystal display screen.

On the basis of the existing functions of the temperature control panel, the valve self-cleaning maintenance function is added, which means that the valve is opened and closed by a periodic time program, and the dirt on the surface of the valve core is removed by the movement of the valve core itself, so as to prevent the hard deposit from being formed on the surface of the valve core due to the long-term static movement of the valve, and keep the valve core flexible.

The temperature control panel detects that the valve is closed or open for n consecutive days, automatically switches the valve for m times, and then repeats the cycle according to this rule. For example, in the central air conditioning system, the valve is closed for several months in spring and autumn. If n is set to 15 days, it will automatically trigger once every 15 days.

Or, when the time of the temperature control panel reaches the set time point, the temperature control panel automatically opens and closes the valve for m times immediately. If it is triggered automatically at 12 o'clock on the 1st of each month, the self-cleaning action of the electric water valve will be triggered regardless of whether the air conditioner terminal is running or not; Because the self-cleaning action time is very short, even if the air conditioning terminal is running, the impact on indoor air conditioning can be almost ignored.

Or the condition means that the valve is triggered at a certain time point when it does not work after a period of normal operation, for example, at 6 pm every day, the self-cleaning action of the electric water valve is triggered after the air conditioner finishes running and shuts down.

Furthermore, on the basis of the existing mode of the temperature control panel, a temperature locking function which can lock the lowest cooling value and the highest heating value respectively is added. After the manager locks the cooling minimum value under the temperature locking function, when the user adjusts the set temperature in the cooling mode, the set temperature will not decrease after reaching the locked cooling minimum value. After the manager locks the heating maximum value under the temperature locking function, when the user adjusts the set temperature in the heating mode, the set temperature will not rise after reaching the locked heating maximum value, thus preventing the user from setting the temperature too low or too high in the internal program of the temperature control panel.

Further, the parameter setting of the valve self-cleaning maintenance function and locking temperature function can be entered by any combination of keys on the temperature control panel. After entering, the duration of N days, the number of switches M, the self-cleaning time point, and the locked maximum and minimum temperature values can be set by using the increase key 23, the decrease key 24 and other keys.

Further, the parameter setting of the valve self-cleaning maintenance function and locking temperature function can be entered by any three key combinations on the temperature control panel, for example, in the power-on state, press the mode key 21 continuously for more than three times within five seconds, and then press the mode key 21 and the add key 23 at the same time.

Further, the parameter setting of the valve self-cleaning maintenance function and locking temperature function can be entered through the combination operation of any two keys on the temperature control panel, for example, pressing and holding the mode key 21 and the add key 23 for five seconds at the same time; Or press and hold the wind speed key 22 and the increase key 23 for five seconds to enter; Or press the mode key 21 four times continuously, then press the wind speed key 22 four times continuously, or other similar key combinations.

Further, the parameter setting of the valve self-cleaning maintenance function and locking temperature function is entered by pressing any key on the temperature control panel for a certain period of time (i.e., pressing the mode key 21 continuously for six seconds. Or press and hold the wind speed key 22 continuously for six seconds to enter the temperature locking function; Or press and hold the increase key 23 continuously for six seconds to enter the temperature locking function; Or press and hold the on-off key for 20 seconds continuously to enter the valve self-cleaning maintenance function and locking temperature mode, or other similar key operation methods.

The valve self-cleaning maintenance function and temperature locking function are operated and used by managers, which are not needed by ordinary air-conditioner users. Through the above-mentioned combined key operation, ordinary air-conditioner users are not allowed to enter the temperature locking function at will, and the complexity of daily air-conditioner operation is not increased.

After entering the parameter setting of the valve self-cleaning maintenance function, the value displayed in the original set temperature symbol area 35 is continuous days N, and the value displayed in the original indoor temperature symbol area 34 is valve opening and closing times M; Press the mode key 21, and the day N flashes, which is modified by the increase key 23 and the decrease key 24, and confirmed by the wind speed key 22; Press the mode key 21 again, and the switching frequency M flashes, which is modified by the increase key 23 and the decrease key 24 and confirmed by the wind speed key 22; Press the switch key 20 again to exit the valve self-cleaning maintenance function.

After entering the parameter setting of temperature locking function, the cooling mode symbol and flashing set temperature appear on the display screen at this time, and the value desired by the manager is set by the increase key and the decrease key, and then the wind speed key is pressed to confirm, and the set temperature stops flashing; Press the mode key again to display the heating mode symbol and flashing set temperature, set it to the value desired by the manager through the increase key and the decrease key, then press the wind speed key to confirm, and the set temperature stops flashing. Press the switch button again to exit the setting.

Furthermore, the operation keys and the display screen can adopt an integrated touch liquid crystal display screen.

Furthermore, after the temperature control panel exits through the on-off key, the temperature control panel can automatically remember the valve duration N and switching times M set by the manager, and the locked cooling minimum value and heating maximum value, which can be stored continuously and will not be lost due to power failure.

Furthermore, a random time parameter S is added to the valve self-cleaning maintenance function, and after the temperature control panel detects that the valve is closed or opened for N consecutive days +S, the temperature control panel opens and closes the valve for M times, and the unit of the random time S is minutes, hours or days. In this way, in some specific central air-conditioning systems, thousands of valves in the air-conditioning system can be prevented from opening at the same time at a certain time point, causing impact on the pipeline water system.

Furthermore, the parameter setting of the valve self-cleaning maintenance function and temperature locking function can also be remotely set by a computer through the network interface of the temperature control panel.

Adding a random parameter S1 to the time program, wherein the unit of the random parameter S1 is minutes, hours or days; After the temperature control panel detects that the valve is closed for N days +S1, the temperature control panel opens and closes the valve for M times, and then repeats the cycle according to this rule; Or when the time of the temperature control panel reaches the set time point and is delayed by S1, the valve is detected to be in a closed state, and the temperature control panel immediately and automatically opens and closes the valve for M times.

Adding a random parameter S2 to the time program, wherein the unit of the random parameter S2 is minutes, hours or days; After the temperature control panel detects that the valve is open for N days +S2, the temperature control panel closes and opens the valve for M times, and then repeats the cycle according to this rule; When the time of the temperature control panel reaches the set time point and is delayed by S2, the valve is detected to be in an open state, and the temperature control panel automatically closes and opens the valve for M times immediately.

Furthermore, the parameter setting of the valve self-cleaning maintenance function and temperature locking function can also be set by a remote controller through an infrared or wireless interface configured on the temperature control panel.

Furthermore, the temperature control panel can be used not only for fan coils but also for wind cabinets, such as ceiling fresh fans and ceiling wind cabinets.

Furthermore, the temperature control panel is respectively connected with a cold water valve and a hot water valve, such as a fan coil unit applied to four pipes.

The valve self-cleaning maintenance function automatically closes when the temperature control panel is in any mode of refrigeration, heating and air supply.

The difference between Embodiment 2 and Embodiment 1 is that no temperature control panel is used, and the valve is directly electrically connected with the control center, which directly triggers the self-cleaning of the valve.

Embodiment 3 is different from Embodiment 1 in that every opening and closing action in the self-cleaning action of the valve adopts positive and negative progressive. When the control center or control terminal drives the valve from closed to open, it first gives the valve opening signal to make the valve core move forward for a certain position, then gives the valve closing signal, and the valve core moves backward for a certain position, repeating several times, each time the reverse movement position is smaller than the forward movement position, and then all the valves are opened, with a slight pause between the forward and reverse movements; If the valve action time is 10 seconds, first send out a 5-second opening signal, stop for 1 second, then send out a 2-second closing signal, then stop for 1 second, then send out a 2-second closing signal, then stop for 1 second, finally send out a 4-6-second opening signal, and the valve is fully open; or vice versa, Dallas to the auditorium This method is mainly applicable to valves with positive and negative spool movement.

The difference between Embodiment 4 and Embodiment 1 is that every opening and closing action in the valve self-cleaning action adopts pulse progressive. When the valve is turned from closed to open, first give the valve an opening signal pulse, then interrupt the opening signal, and then give the valve an opening signal pulse first, and repeat it several times until the valve is fully opened. If the valve action time is 10 seconds, first send out a 3-second opening signal, stop for 1 second, then send out a 3-second opening signal, stop for 1 second, and finally send out a 4-6-second opening signal, and the valve is fully open; or vice versa, Dallas to the auditorium.

This method is mainly applicable to valves whose valve core is opened when power is on, and whose valve core is closed and reset by spring after power is off. In this way, through the forward movement of power transmission, the power-off spring pushes the reverse movement to realize the flexible opening of the valve core in the opening process.

Embodiment 5, which is different from Embodiment 1, is that the valve is self-cleaning. By setting a valve driving current detection device on the control terminal, when the valve is opened or closed forward, only the driving current of the valve exceeds the set current, the flexible switching mode is adopted.

Embodiment 6, which is different from Embodiment 1, is that the valve is used in the gas pipeline system, and at this time, the valve is also called the electric air valve.

Embodiment 7, which is different from Embodiment 1, is that the valve is used in the oil pipeline system, at which time the valve is also called the electric oil valve.

Embodiment 8, which is different from Embodiment 1, is that the valve is used in the steam pipeline system, at which time the valve is also called the electric steam valve.

Embodiment 9

The difference with Embodiment 1 is that the valve flexible action function is added on the basis of the existing functions of the temperature control panel.

The switch action of the valve driven by the temperature control panel includes flexible switch mode, and the valve action includes flexible switch mode besides conventional direct switch; That is, the valve is opened in a flexible way, or closed in a flexible way, or both valves are opened and closed in a flexible way; Or the flexible switch mode is adopted for each action of the valve, or the flexible switch mode is adopted only for the specific part of the valve. The valve is different from the solenoid valve, and the switching action time is generally more than ten seconds, which makes it possible to realize flexible switching. The flexible action has the following two driving signal modes:

1) The driving signal adopts positive and negative gradual way, which first gives the valve opening signal, then sends out the opening signal of t1 seconds to make the valve core move forward for a certain position, and then gives the valve closing signal of t2 seconds. The valve core moves backward for a certain position, repeating H1 times, each time the reverse movement position is smaller than the forward movement position, and then all the valves are opened, in which the forward and reverse movements can be stopped for t3 seconds; And vice versa.

If the valve action time is 10 seconds, first send out a 5-second opening signal, stop for 1 second, then send out a 2-second closing signal, then stop for 1 second, then send out a 2-second closing signal, then stop for 1 second, finally send out a 4-6-second opening signal, and the valve is fully open. And vice versa; This method is mainly applicable to valves with positive and negative spool movement.

2) The driving signal is pulsed. When the valve is closed to open, first give the valve an opening signal pulse for t4 seconds, then interrupt the opening signal for t5 seconds, then give the valve an opening signal pulse for t6 seconds, and repeat it for H2 times until the valve is fully opened, and vice versa.

If the valve action time is 10 seconds, first send out a 3-second open signal, stop for 1 second, then send out a 3-second open signal, stop for 1 second, and finally send out a 4-6-second open signal, and the valve is fully open. Or vice versa, Dallas to the auditorium.

This method is mainly applicable to valves whose valve core is opened when power is on, and whose valve core is closed and reset by spring after power is off. In this way, through the forward movement of power transmission, the power-off spring pushes the reverse movement to realize the flexible opening of the valve core in the opening process.

The purpose of flexible switch mode is to make impurities attached to the surface of the valve core or stuck at the valve core loose by moving back and forth, so as to prevent one-time blocking. Combined with the flow of pipeline water, the loose impurities are washed away and the valve core becomes flexible.

In addition, trigger conditions for flexible operation can be set, for example, a valve drive current detection circuit is set in the input module, and when the valve operates, only the drive current exceeds the set current can the flexible switch mode be triggered.

Or keep the valve open or closed for n days; N is an integer or decimal number greater than 1; Or reach a preset time point and trigger flexible action.

The repetition times H1, H2, positive and negative action time t1-3, pulse time t4-6, etc. in the flexible switch mode can be set by the input module or directly solidified in the control module.

Parameter setting of valve flexible action can be entered by any combination of keys on the temperature control panel. After entering, the number of repetitions H1, H2, positive and negative action time t1-3 and pulse time t4-6 can be set by adding key 23, decreasing key 24 and other keys.

Further, the parameter setting can be entered through the combination operation of any three keys on the temperature control panel. For example, in the power-on state, press the mode key 21 continuously for more than three times within five seconds, and then press the mode key 21 and the add key 23 at the same time.

Further, the parameter setting can be entered by combining any two keys on the temperature control panel, for example, pressing and holding the mode key 21 and the add key 23 for five seconds at the same time; Or press and hold the wind speed key 22 and the increase key 23 for five seconds to enter; Or press the mode key 21 four times continuously, then press the wind speed key 22 four times continuously, or other similar key combinations.

Further, you can press any key on the temperature control panel for a long time (i.e., press and hold the mode key 21 for six seconds to enter; Or press and hold the wind speed key 22 continuously for six seconds to enter, or other similar key operation methods.

The valve flexible action setting function is used by the manager, which is not needed by ordinary air-conditioner users. Through the above-mentioned combined key operation in various ways, the ordinary air-conditioner users are not allowed to enter at will, and the complexity of daily air-conditioner operation is not increased.

After entering the valve flexibility parameter setting, the original set temperature symbol area 35 displays the display area N with time parameters t1-6, and the original indoor temperature symbol area 34 displays the display area with valve action times H1-H2. Press the mode key 21, and the time parameter flashes, which is modified by the increase key 23 and decrease key 24, confirmed by the wind speed key 22, and then pressed the wind speed key 22 to switch the time parameter. Press the mode key 21 again, and the time parameter flashes, which is modified by the increase key 23 and decrease key 24, confirmed by the wind speed key 22, and then press the wind speed key 22 to switch the time parameter; Press the switch key 20 again to exit the valve parameter setting.

When the temperature control panel is provided with a network interface, the above parameters can be set remotely by a computer.

Embodiment 10

The difference with Embodiment 1 is that, on the basis of the existing functions of the temperature control panel, a temperature locking function capable of locking the lowest cooling value and the highest heating value is added.

After the manager locks the cooling minimum value under the temperature locking function, when the user adjusts the set temperature in the cooling mode, the set temperature will not decrease after reaching the locked cooling minimum value. After the manager locks the heating maximum value under the temperature locking function, when the user adjusts the set temperature in the heating mode, the set temperature will not rise after reaching the locked heating maximum value, thus preventing the user from setting the temperature too low or too high in the internal program of the temperature control panel.

Further, the parameter setting of the locking temperature function can be entered through any key combination operation on the temperature control panel. After entering, the duration of N days, the number of switching times m, the self-cleaning time point, and the locked maximum and minimum temperature values can be set through the increase key 23, the decrease key 24 and other keys.

Further, the parameter setting of the temperature locking function can be entered through the combination operation of any three keys on the temperature control panel. For example, in the power-on state, press the mode key 21 continuously for more than three times within five seconds, and then press the mode key 21 and the add key 23 at the same time.

Further, the parameter setting of the locking temperature function can be entered by combining any two keys on the temperature control panel, for example, pressing and holding the mode key 21 and the increase key 23 for five seconds at the same time; Or press and hold the wind speed key 22 and the increase key 23 for five seconds to enter; Or press the mode key 21 four times continuously, then press the wind speed key 22 four times continuously, or other similar key combinations.

Further, the parameter setting of the locking temperature function is entered by pressing any key on the temperature control panel for a long time (i.e., pressing the mode key 21 for six seconds). Or press and hold the wind speed key 22 continuously for six seconds to enter the temperature locking function; Or press and hold the increase key 23 continuously for six seconds to enter the temperature locking function; Or press and hold the on/off key 20 continuously for six seconds to enter the locked temperature mode, or other similar key operation methods.

The temperature locking function is operated by the manager, which is not needed by ordinary air-conditioner users. Through the above-mentioned combined key operation, ordinary air-conditioner users are not allowed to enter the temperature locking function at will, and the complexity of daily air-conditioner operation is not increased.

After entering the parameter setting of the temperature locking function, the cooling mode symbol and flashing set temperature appear on the display screen at this time, and the value desired by the manager is set by the increase key 23 and the decrease key 24, and then the wind speed key 22 is pressed to confirm, and the set temperature stops flashing; Press the mode key again to display the heating mode symbol and flashing set temperature, set it to the value desired by the manager through the increase key 23 and the decrease key 24, then press the wind speed key 22 to confirm, and the set temperature stops flashing. Press the switch button again to exit the setting.

Furthermore, after the temperature control panel exits through the on-off key, the temperature control panel can automatically remember the locked cooling minimum value and heating maximum value set by the manager, which can be stored continuously and will not be lost due to power failure.

Furthermore, the parameter setting of the temperature locking function can also be remotely set by a computer through the network interface of the temperature control panel.

Furthermore, the parameter setting of the temperature locking function can also be set by the remote controller through the infrared or wireless interface configured on the temperature control panel.

Embodiment 11 is different from Embodiment 1 in that the temperature control panel can be used not only for fan coils but also for air cabinets, such as ceiling fresh fans and ceiling air cabinets.

Embodiment 12 is different from Embodiment 1 in that the temperature control panel is connected with a cold water valve and a hot water valve respectively, such as a fan coil used in four pipes.

Embodiment 13 is different from Embodiment 1 in that the opening and closing action of the driving valve of the temperature control panel includes the above-mentioned flexible opening and closing mode, and the temperature control panel also has three functions of the above-mentioned valve self-cleaning maintenance and the above-mentioned temperature locking, or a combination of any two functions.

Further, the valve body of the valve is a two-way valve or a three-way valve; The valve core is ball valve, globe valve or gate valve.

There are only preferred embodiments of the present invention above, instead of being used to limit the present invention. Those skilled in the art can make various modifications and variations to the present invention without departing from the spirit and scope of the present invention obviously. They all belong to the protection scope of the present invention if these modifications and variations of the present invention fall within the scope of the claims and their equivalent technologies.

What is claimed is:

1. A valve control method, wherein a trigger condition and a self-cleaning action of the valve are set on a control center or a control terminal connected with the valve; when the trigger condition is met, triggering and completing the self-cleaning action of the valve;
   the trigger condition refers to that the valve keeps open or closed for N days;
   where N is an integer or a decimal number greater than 1;
   or the trigger condition refers to reaching a preset time point;
   or the trigger condition refers to a time point when the valve is not working after finishing a previous working operation;
   the self-cleaning action of the valve refers to that the valve is switched once from an initial state which is an open state to a closed state, and then returns to the initial state after being switched an even number of times; or the valve is switched once from an initial state which is the closed state to the open state, and then returns to the initial state after being switched an even number of times;
   opening and closing action of the valve comprises a flexible switching mode;
   the flexible switching mode is that a valve driving signal adopts both a positive and negative progressive mode, wherein when the valve is switched from closed to open, a valve opening signal is given first to drive a valve core to move forward to a predetermined position, and then a valve closing signal is given to drive the valve core to move backward to a predetermined position, where a stroke of backward movement is smaller than a stroke of forward movement, and a pause exists between forward and backward movements, repeating for a plurality of times until the valve is completely open; and wherein when the valve is switched from open to closed, the valve closing signal is given first to drive the valve core to move backward to a predetermined position, and then the valve opening signal is given to drive the valve core to move forward to a predetermined position, where a stroke of forward movement is smaller than a stroke of backward movement, and a pause exists between forward and backward movements, repeating for a plurality of times until the valve is completely closed;
   alternatively, the flexible switching mode is that the valve driving signal adopts pulse progressive, wherein when the valve is switched from closed to open, first give the valve a pulse of opening signal, then interrupt the opening signal, then give the valve another pulse of opening signal, repeat for a plurality of times until the valve is fully opened; and wherein when the valve is switched from open to close, first give the valve a pulse of closing signal, then interrupt the closing signal, then give the valve another pulse of closing signal, repeat for a plurality of times until the valve is fully closed.

2. The valve control method according to claim 1, wherein the flexible switching mode is adopted only when a driving current of the valve exceeds a set current.

3. The valve control method according to claim 1, wherein a parameter setting of the trigger condition is entered by combining a plurality of keys on the control terminal or by pressing and holding the keys for a predetermined period of time.

4. The valve control method according to claim 1, wherein to avoid a sudden change of pipeline flow caused by simultaneous operation of a plurality of valves, a random time parameter S is added to the trigger condition, that is, the self-cleaning action of the valve is triggered by delaying S time after a preset triggering time is reached.

5. The valve control method according to claim 1, wherein when the valve is a water valve, the valve self-cleans and triggers a water pump; or when the valve is an air valve, the valve self-cleans and triggers an air pump; or when the valve is an oil valve, the valve self-cleans and triggers an oil pump; or when the valve is an air valve, the valve self-cleans and triggers a fan; or when the valve is a steam valve, the valve self-cleans and a steam source is turned on.

6. The valve control method according to claim 1, wherein the control terminal is provided with a network interface, and the control terminal is remotely controlled by a computer to realize a parameter setting.

7. A valve self-cleaning control terminal which is connected with a valve to control opening and closing of the valve, wherein the valve self-cleaning control terminal has a valve self-cleaning program;
   a trigger condition and a self-cleaning action are set on the valve self-cleaning control terminal; when the trigger condition is met, the valve self-cleaning control terminal drives the valve to perform the self-cleaning action;
   the trigger condition refers to that the valve keeps open or closed for N days; where N is an integer or a decimal number greater than 1;
   or the trigger condition refers to reaching a preset time point;
   or the trigger condition refers to a time point when the valve is not working after finishing a previous working operation;
   the self-cleaning action of the valve refers to that the valve is switched once from an initial state which is an open state to a closed state, and then returns to the initial state after being switched an even number of times; or the valve is switched once from an initial state which is the closed state to the open state, and then returns to the initial state after being switched an even number of times.

8. The valve self-cleaning control terminal according to claim 7, wherein to avoid a sudden change of pipeline flow caused by simultaneous operation of a plurality of valves, a random time parameter S is added to the trigger condition, that is, the self-cleaning action of the valve is triggered by delaying S time after a preset triggering time is reached.

9. The valve self-cleaning control terminal according to claim 7, further comprising a linkage signal output terminal; when the valve is a water valve, the linkage signal triggers a water pump; or when the valve is an air valve, the linkage signal triggers an air pump;
when the valve is an oil valve, the linkage signal triggers an oil pump; or when the valve is an air valve, the linkage signal triggers a fan; or when the valve is a steam valve, the linkage signal turns on a steam source.

10. The valve self-cleaning control terminal according to any one of claims 7-9, characterized in that the valve self-cleaning control terminal is a temperature control terminal and comprises an input module and a display screen, wherein the input module comprises keys.

11. The valve self-cleaning control terminal according to claim 10, wherein the keys and the display screen are integrated touch screens.

12. The valve self-cleaning control terminal according to claim 10, wherein setting of the trigger condition is entered through combination of the keys on the input module, or by pressing and holding one of the keys for a predetermined period of time, or by a locking key separately set on the input module.

13. The valve self-cleaning control terminal according to claim 10, wherein the input module is provided with a network interface, and the trigger condition and the self-cleaning action are remotely set by a computer.

* * * * *